United States Patent Office 3,168,536
Patented Feb. 2, 1965

---

3,168,536
6,16α-DIMETHYL STEROIDS
David Neville Kirk, Vladimir Petrow, and David Morton
Williamson, all of London, England, assignors to The
British Drug Houses Limited, London, England, a
British company
No Drawing. Filed Mar. 3, 1959, Ser. No. 796,762
Claims priority, application Great Britain, Mar. 7, 1958,
7,451/58
2 Claims. (Cl. 260—397.3)

This invention is for improvements in or relating to organic compounds and has particular reference to the preparation of 6:16α-dimethylpregnenolone and 6α:16α-dimethylprogesterone.

It is an object of the present invention to provide a process for converting 3β-hydroxy-6-methylpregna-5:16-dien-20-one (having the Formula II below where R=H) into 6:16α-dimethylpregnenolone (having the Formula I below where R=H) and thence into 6α:16α-dimethylprogesterone (having the Formula IV below).

It is another object of the invention to provide the important intermediate 6:16α-dimethylpregnenolone and to provide 6α:16α-dimethylprogesterone which is of value on account of its progestational properties.

According to the present invention there is provided a process for the preparation of 6:16α-dimethylpregnenolone having the formula

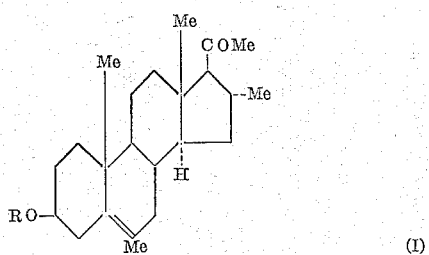

where R=H which process comprises introducing a 16-methyl group into 3β-hydroxy-6-methylpregna-5:16-dien-20-one prepared, for example, by the process disclosed in U.S. Patent No. 2,871,246, granted January 27, 1959, and having the formula

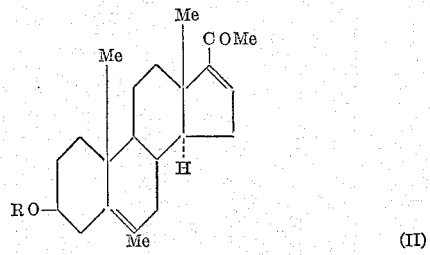

where R=H, by treatment with a methyl Grignard reagent.

The 6:16α-dimethylpregnenolone may subsequently be oxidised to give 6:16α-dimethylpregn-5-en-3:20-dione

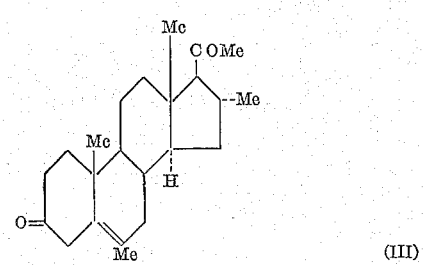

followed by isomerisation of the resulting compound to give 6α:16α-dimethylprogesterone

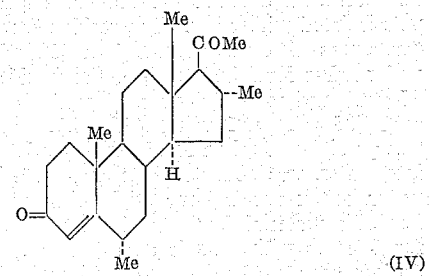

In carrying out the process of the invention, it is convenient to protect the hydroxy group of 3β-hydroxy-6-methylpregna-5:16-dien-20-one (II; R=H) prior to addition of the Grignard reagent. This is conveniently effected by acylation to give the 3β-acyloxy-6-methylpregna-5:16-dien-20-one (II; where R is an acyl group containing not more than 10 carbon atoms). The acyl group is subsequently eliminated by hydrolysis. Alternatively the hydroxyl group at the 3-position (II; R=H) may be protected by conversion into the tetrahydropyranyl ether

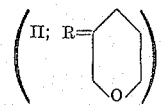

and the 3-hydroxyl group subsequently regenerated by treatment with mineral acid.

Addition of the methyl Grignard reagent to the derivative (II; where R=acyl or tetrahydropyranyl as hereinabove defined) of 3β-hydroxy-6-methylpregna-5:16-dien-20-one is performed in a manner well known to those skilled in the art.

Isolation of the resulting 6:16α-dimethylpregnenolone derivative follows methods well known to those skilled in the art. Thus when 3β-acyloxy-6-methylpregna-5:16-dien-20-one (II; R=acyl as hereinabove defined) is employed as starting material and the addition is effected using an excess of methyl magnesium iodide or bromide in a solvent such as benzene, toluene, or dibutyl ether at 80° C., the product obtained consists of the required 6:16α-dimethylpregnenolone (I; R=H) admixed with non-ketonic by-products formed through 1:2-addition of the Grignard reagent to the carbonyl centre. The total product may be treated with semi-carbazide and the resulting mixture extracted with ether in which the semi-carbazone of the required addition product (I; R=H) is insoluble and may be isolated in an essentially pure condition. The ketone (I; R=H) is conveniently recovered from the semicarbazone by trans-semicarbazonation using, for example, pyruvic acid in the presence of sodium acetate/acetic acid.

Conversion of the 6:16α-dimethylpregnenolone (I) into 6α:16α-dimethylprogesterone (IV) is conveniently effected in one operation employing the Oppenauer oxidant aluminium tert.-butoxide/cyclohexanone (or acetone) in toluene solution. Alternatively, oxidation of the alcohol (I; R=H) to the ketone (III) may be effected with an oxidant such as chromic acid in acetone, and the ketone (III) isomerised to the product (IV) in any convenient manner such as by treatment with oxalic acid.

Following is a description by way of example of a method of carrying the invention into effect.

EXAMPLE

*6:16α-dimethyl-3β-hydroxypregn-5-en-20-one (I; R=H)*

To a solution of methyl magnesium iodide, prepared from magnesium (6 gm.) and methyl iodide (15 ml.)

in dry ether (150 ml.) was added a solution of 3β-acetoxy-6-methylpregna-5:16-dien-20-one in dry toluene (75 ml.). The ether was distilled off until the temperature of the reaction mixture reached 80° C. when the mixture was heated on a steam-bath under reflux for 16 hours with stirring. The complex was decomposed by pouring onto ice/water containing hydrochloric acid and the products isolated with ether. The residue from the ether extracts was dissolved in methanol (50 ml.) and heated under reflux for 1 hour with semicarbazide hydrochloride (5 gm.) and sodium acetate (5 gm.) dissolved in methanol (25 ml.) and water (25 ml.). The solid which was precipitated when the foregoing mixture was poured into water, was collected by filtration, dried and heated under reflux for 1 hour with ether (500 ml.). The insoluble material was filtered off and heated at 75° C. for 4 hours with pyruvic acid (2.5 ml.) water (6 ml.) sodium acetate (3 gm.) and acetic acid (18 ml.). The product was isolated with methylene chloride and crystallised from acetone/hexane to give 6:16α-dimethyl-3β-hydroxypregn-5-en-20-one needles, M.P. 170 to 172° C., $[\alpha]_D^{22}$ −26° (c. 0.464 in $CHCl_3$).

*6α:16α-dimethylpregn-4-ene-3:20-dione* (IV)

The foregoing compound (3 gm.) was dissolved in cyclohexanone (35 ml.) and heated under reflux for 45 minutes with aluminium tert.-butoxide (3 gm.) in dry toluene (25 ml.). Rochelle salt solution was added and the mixture steam distilled for 4 hours. The product was isolated with ether, and after removing the organic solvents, the residue was passed through a short column of alumina in benzene solution.

The product crystallised from hexane to give 6α:16α-dimethylpregn-4-ene-3:20-dione, needles, M.P. 114 to 115° C., $\lambda_{max.}^{EtOH} = 241$ m$\mu$, $\epsilon = 13,118$, $[\alpha]_D^{22} + 132$ (c. 0.648 in $CHCl_3$)

We claim:
1. 6:16α-dimethylpregnenolone.
2. 6α:16α-dimethylprogesterone.

References Cited by the Examiner
UNITED STATES PATENTS

| | | | |
|---|---|---|---|
| 2,350,792 | 6/44 | Miescher et al. | 260—397.3 |
| 2,838,534 | 6/58 | Babcock et al. | 260—397.45 |
| 2,871,246 | 1/59 | Loken | 260—397.4 |
| 2,878,247 | 3/59 | Miramontes et al. | 260—239.55 |

OTHER REFERENCES

Marker et al.: J. Am. Chem. Soc., vol. 64, pages 1280–1281, June 1942.

Ringold et al.: J. Org. Chem., vol. 22, pages 99 and 100 (1957).

LEWIS GOTTS, *Primary Examiner.*

LESLIE H. GASTON, MORRIS LIEBMAN, *Examiners.*